United States Patent [19]
Elliott

[11] 4,451,913
[45] May 29, 1984

[54] VIDEO DISC READ BACK SCANNER

[75] Inventor: James E. Elliott, San Pedro, Calif.

[73] Assignee: Discovision Associates, Costa Mesa, Calif.

[21] Appl. No.: 290,261

[22] Filed: Aug. 3, 1981

Related U.S. Application Data

[63] Continuation of Ser. No. 924,538, Jul. 14, 1978, Pat. No. 4,282,598, which is a continuation-in-part of Ser. No. 812,180, Jul. 1, 1977, abandoned, which is a continuation of Ser. No. 662,238, Feb. 27, 1976, abandoned, which is a continuation-in-part of Ser. No. 465,823, May 1, 1979, Pat. No. 3,944,727, Ser. No. 299,893, Oct. 24, 1972, Pat. No. 3,829,622.

[51] Int. Cl.³ ............................................. G11B 7/00
[52] U.S. Cl. .................... 369/110; 369/111; 369/44; 250/225
[58] Field of Search ............. 369/44, 100, 111, 46, 369/110, 109, 121, 122; 365/120, 124, 127; 250/202, 225, 570; 358/342

[56] References Cited

U.S. PATENT DOCUMENTS

| | | | |
|---|---|---|---|
| 3,138,669 | 6/1964 | Rabinow | 369/111 |
| 3,198,880 | 8/1963 | Foulon | 369/112 |
| 3,287,563 | 11/1966 | Clunis | 250/566 |
| 3,314,075 | 4/1967 | Becker | 369/100 |
| 3,348,233 | 10/1967 | Hertz | 369/119 |
| 3,381,085 | 4/1968 | Johnson | 369/111 |
| 3,381,086 | 4/1968 | Moss | 369/111 |
| 3,396,266 | 8/1968 | Max | 365/121 |
| 3,530,258 | 9/1970 | Gregg | 369/111 |
| 3,534,166 | 10/1970 | Koysel | 346/762 |
| 3,567,855 | 3/1971 | Hamisch | 250/202 |
| 3,612,642 | 10/1971 | Dostal | 350/6.6 |
| 3,638,185 | 1/1972 | Dell | 346/108 |
| 3,654,624 | 4/1972 | Becker | 346/762 |
| 3,657,707 | 4/1972 | McFarland | 346/762 |
| 3,737,877 | 6/1973 | Feinleib | 346/762 |
| 3,829,622 | 8/1974 | Elliott | 369/111 |
| 3,944,727 | 3/1976 | Elliott | 369/44 |
| 4,282,598 | 8/1981 | Elliott | 369/44 |

OTHER PUBLICATIONS

"Philips TV Disk" Electronics Review, 9/11/72, pp. 29, 30.
"An Experimental TV Recording & Playback System Using Photographic Discs" by Rice, Journal of SMPTE, vol. 79, No. 11, Nov., 1970, pp. 997–1002.
"Laser Recording Unit for High Density Digital Data Storage" by McFarland, pp. 1369–1380, Fall Joint Computer Conference, 1968.

Primary Examiner—Alan Faber
Attorney, Agent, or Firm—Ronald J. Clark

[57] ABSTRACT

A video signal play back device derives video signals from successive tracks formed as a continuous spiral on a video disc using a light source and a lens system, which is carried by a rotatable element at a predetermined spacing from the surface of the disc and which defines a folded optical path. The rotatable element translates the lens system in the radial direction relative to the disc for "coarse" steering of the light beam along the information tracks as the disc is rotated by a turntable. The optical path includes a mirror which is articulated for rotational motion about an axis which shifts the point of impingement of the transmitted light beam upon the disc in the radial direction. The returned beam is directed to a photosensitive pick-up which provides input signals to a circuit which generates a "fine" servo control signal to drive the articulated mirror.

3 Claims, 3 Drawing Figures

U.S. Patent
May 29, 1984
4,451,913
Fig. 1
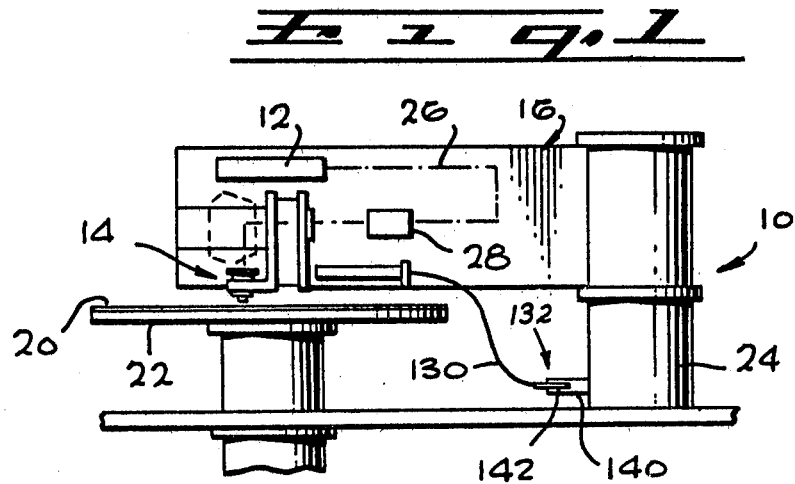
Fig. 2
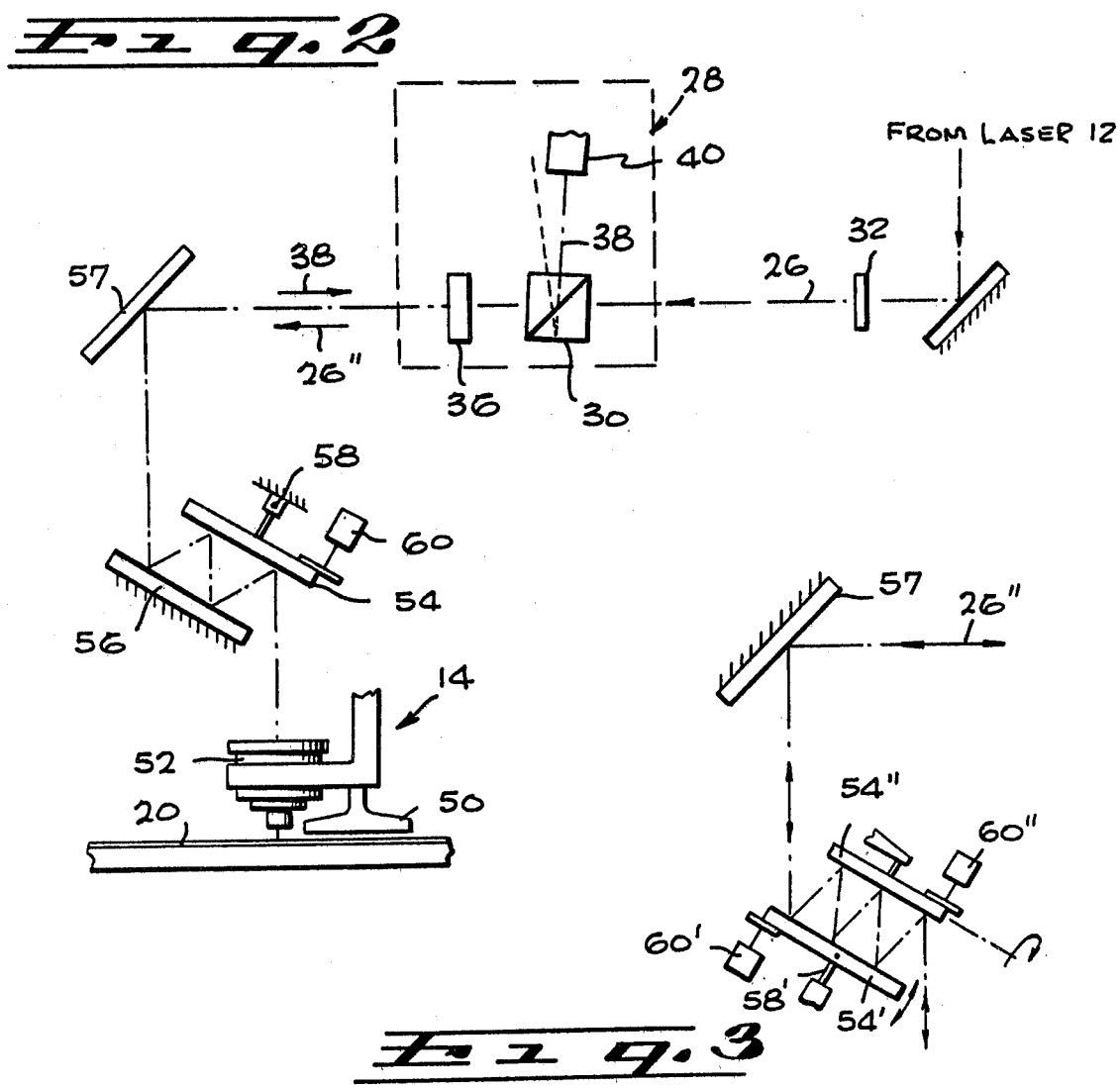
Fig. 3

VIDEO DISC READ BACK SCANNER

CROSS-REFERENCES TO RELATED APPLICATIONS

This is a continuation of copending application Ser. No. 924,538, filed July 14, 1978, now U.S. Pat. No. 4,282,598, which was a continuation-in-part of a copending application Ser. No. 812,180, filed July 1, 1977, now abandoned, which was a continuation of application Ser. No. 662,238, filed Feb. 27, 1976, now abandoned, which was a continuation-in-part of a streamlined divisional application Ser. No. 465,823, filed May 1, 1974, now U.S. Pat. No. 3,944,727, which was divided from application Ser. No. 299,893, filed Oct. 24, 1972, now U.S. Pat. No. 3,829,622. Each of the foregoing applications and issued patents is assigned to the assignee of the present application.

BACKGROUND OF THE INVENTION

1. Field of the Invention

Systems have heretofore been developed for reproducing signals at video frequencies from information recorded on discs, tapes, or other media. Such systems have utilized, among other things, optical recordings upon photosensitive discs, electron beam recording on thermo plastic surfaces and, in prior patents assigned to the assignee of the present invention, systems utilizing a rotating disc which is responsive to impinging radiation to reflect or transmit radiation corresponding to and representative of the information stored on the surface of the disc.

For example, in U.S. Pat. No. 3,530,258, issued to David Paul Gregg and Keith O. Johnson on Sept. 22, 1970, there was shown and described a system in which a video signal transducer included a servo controlled pair of flexible, fibre optic elements. An air bearing supported an objective lens system. A light source of radiant energy was positioned below the disc and the transducer was responsive to transmitted light.

Other patents have shown the use of a radiant source which directed an energy beam to the surface of the disc and provided a transducer that was responsive to reflected energy. One of the major problems to be encountered in the recording and reproduction of video information, arises directly from a consideration of the energy levels involved in such a process and the restraints imposed by the considerations of size, weight and operating conditions.

To be commercially desirable as a home instrument, the system should be able to store and reproduce a "program" of at least 15 to 30 minutes in length. The record disc should be of an easily handled size, comparable to the phonograph records currently in use. If the playback turntable was operated at 1800 rpm, some 54,000 revolutions would provide 30 minutes of playback. Assuming a 1 micron track width and 1 micron spacing between adjacent tracks, a circular band approximately 4.25 inches wide is required. Assuming that the smallest radius at which information can be stored is approximately three inches, the resultant disc is about 15 inches in diameter. The duration of the program or the speed of the turntable can change the dimensions of the recorded area, as can the width of the individual track and the spacing between adjacent tracks.

Assuming that the video information has been recorded in some digital fashion, the presence or absence of a signal can be detected at an appropriate information rate. If the width of the track is approximately one micron, and the space between adjacent tracks is also one micron, the quantity of energy necessary to impart information from the disc can be determined. It is necessary to provide sufficient radiant energy to "illuminate" a "spot" of approximately one micron in diameter and, at the same time, provide sufficient radiant energy at the detector, so that the "presence" or "absence" of a signal can be distinguished.

It has been discovered, in attempting to utilize the transmitted radiation techniques of the prior art, that the provision of an inordinately large amount of radiation into the system is required in order to "transmit" a sufficiently useful increment of energy for detection through the record. It has also been determined that a substantial magnification is required to enable a state-of-the-art transducer to respond to a one micron diameter radiant spot.

If a light source illuminates the entire field which can be scanned by the detector under control of the servo system, it will be seen that an extraordinary light intensity must be provided before the light transmitted through or reflected from the disc will be of sufficient intensity to register upon the photosensitive device.

In a preferred embodiment of the present invention, an articulated mirror is utilized with a highly collimated source, to move the point of impingement of the radiant spot upon the disc. An important aspect of the present invention is the ability to direct or "steer" the illuminating radiation to a particular spot and to return the information from the spot thus illuminated to a detector system.

In the preferred embodiment therefore, a single photosensitive pickup is used as one input to a differential amplifier, and a second input is provided from a fixed bias source. The bias is adjusted to balance the input of the photodetector when it is illuminated by the reflected spot that is approximately half way into the information track, for example, on the periphery side of the track. If the intensity of the radiation upon the detector increases in a system where the track is "darker" than the band between "tracks," then a servo signal is developed to drive the mirror in a first direction, tending to move the spot toward the track and toward the center. Similarly, if the radiation decreases, the relatively higher magnitude of the bias causes an error signal to be generated which moves the mirror and the "spot" in a respectively opposite direction, away from the track and toward the periphery.

Since, in the preferred embodiment, one revolution of the disc represents one "frame" of the T.V. picture, an error in tracking, where the track is "lost," merely results in either the skipping or the repeating of a frame, both of which are undetectable by the human observer. In alternative embodiments, it is possible to use the earlier prior art technique of the photodetector pair.

A second, articulated mirror may be provided which rotates in a second direction, orthogonal to the direction used for the radial steering of the beam and tracking of the image. Such steering may be considered to be in the circumferential direction and would aid in the synchronization and timing of the recorded information with respect to the timing frequencies generated in the reproducer circuits. As is known, television circuits, and especially color television circuits, require extremely accurate time synchronization in order to maintain color fidelity. Therefore, any error in synchronism between the local oscillator of the reproduction apparatus and the timing information recorded on the disc, may be resolved and eliminated through the use of mirror motion in the second direction.

It has been found that any errors resulting from eccentricity of the disc can be simply corrected. It will be noted that the steering and tracking circuit which maintains the radiant spot on the appropriate spiral track will undergo some periodic signal fluctuation that is related to eccentricity. It can then be shown that the change in instantaneous velocity in the circumferential direction also changes in substantially similar fashion, but lags by one-quarter revolution of the disc. Therefore, it is possible either to sense the velocity changes from the recorded timing information and from this derive a correcting signal to drive the tracking servos, or to sense the eccentricity from the tracking servo and use that signal with an appropriate phase shift to drive the "timing" servo to correct for velocity changes due to eccentricity. In an alternative embodiment, a single axis articulated mirror corrects for tracking and electronic circuits compensate for timing errors.

Accordingly, it is an object of the present invention to provide an improved playback assembly for a disc upon which video information has been recorded.

It is yet another object of the invention to provide an improved tracking circuit for optically scanning a video disc.

It is yet a different object of the invention to provide a video disc playback assembly which directs a radiant spot to the surface of the disc and directs the returning radiation to a photosensitive detector, which detects returning radiation from the disc surface.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration only and are not intended as a definition of the limits of the invention.

BRIEF DESCRIPTION OF THE DRAWINGS

FIG. 1 is an idealized side view of a playback assembly according to the present invention;

FIG. 2 is a more detailed block diagram of the elements in the optical playback system; and FIG. 3 is an idealized view of an alternative articulated mirror assembly.

DESCRIPTION OF THE PREFERRED EMBODIMENTS

Turning first to FIG. 1, there is shown, in side view a playback assembly 10 suitable for use in the present invention. The playback assembly 10 includes a laser element 12 which moves with the playback assembly 10. It is, however, within the state-of-the-art to provide a stationary laser which is coupled optically to the movable assembly 10. Preferably, the laser 12 provides coherent, polarized light. A read head 14 is mounted in arm 16 of the playback assembly 10.

A video disc, 20, which has video information recorded upon it is mounted on a turntable 22, which is adapted to rotate the disc 20 at a relatively high speed. In the preferred embodiment, the turntable speed is set at 1800 rpm.

Suitable video discs have been described and claimed in the patents to Gregg, Johnson, supra.

The playback assembly 10 is mounted on a rotatable element 24 which, in the view of FIG. 1, translates the reading head in the radial direction relative to the disc 20 and in an arc that is generally orthogonal to the plane of the drawing.

The laser 12 generates a reading beam 26 which generally passes from the laser 12 through an optical system to the playback head 14. The beam is then directed to the surface of the disc 20 and returns through the playback head 14 along the same optical path until a read assembly 28 is encountered. The read assembly 28 is mounted on the arm 16.

In operation, the laser directs a reading light beam 26 to the surface of the disc 20 through the optical system. The information recorded upon the disc interacts with the impinging beam and a reflected beam is produced which contains the recorded information. The reflected light beam is returned to the optical system which "analyzes" the returned beam to determine whether the beam is properly tracking the signal channel.

If the electronics determine that the laser spot is not being directed to a predetermined area of the information channel, appropriate servo signals are derived which, when applied to the read head 14, cause the point of impingment of the laser beam to shift in the radial direction to retain alignment with the track that is being read.

In an alternative embodiment, the driver for the rotatable element 24 for the playback assembly 10 can also be controlled by the servo signals which changes the position of the laser spot. In yet another embodiment, a motor can be coupled to the turntable driver to provide a predetermined increment of radial motion for each revolution of the turntable 22. In any case, the playback head 10 can be made to track the information channel recorded on the disc 20 with a "coarse" adjustment being applied to the driver of the rotatable element 24 and a "fine" adjustment being applied to an articulated mirror, described in greater detail below.

Turning next to FIG. 2, there is shown a diagram of the elements of the reading system. The reading laser beam 26 is applied to a beam splitting prism 30. The prism 30 is rotated slightly with respect to the optical path. A lens 32 is provided to better form the beam 26 at the surface 20 and to optimize the resolving power of the system. The transmitted portion of the beam 26 is applied through a quarter wave plate 36 and is then directed through the reading head 14 to the disc.

A returning beam 38 containing the information from the disc 20 follows substantially the identical path. At the quarter wave plate 36, the returning beam is now given an additional quarter wave shift for a total polarization of one-half wavelength. The returning beam 38 reaches the beam splitter 30 and is reflected therefrom to a suitable optical system 40. Light from the laser 12 that is initially reflected in the prism 30 and re-reflected from the base of the prism will, due to the slight rotation of the prism 30, be aimed at a point that wholly misses the detector 40. Moreover, the cumulative effect of the quarter wave plate which polarizes the returning beam by one-half wavelength substantially attenuates any transmitted component. What is transmitted is cross polarized with respect to the laser 12.

The read head 14 includes a fluid-bearing member 50 which is adjacent to and supportive of a microscope objective lens 52. A limited amount of vertical adjustment is available in the objective lens 52. Directing the illumination to the objective lens 52 is an articulated mirror 54 which is mounted adjacent to and cooperates with a second or fixed mirror 56 that is substantially parallel with the articulated mirror 54. The fixed mirror receives the reading beam 26 and directs it to the articulated mirror 54.

The reading beam 26 undergoes at least one reflection from the articulated mirror 54 before the beam is applied to the objective lens 52. Two such reflections are illustrated in the embodiment of FIG. 2. Similarly, the beam path is such that a reflected beam 38 returning from the surface of the disc 20 would also undergo two reflections from the articulated mirror 54 and two reflections from the fixed mirror 56 before proceeding into the optical path including an additional fixed mirror 57, disposed at the point of deflection between the third and fourth path portions, which ultimately leads to the read assembly 28.

In the embodiment illustrated, the articulated mirror 54 is mounted on a point pivot 58 that is centrally located within respect to the mirror 54. The mirror 54 may have an oblong shape with the long axis in the plane of the drawing and the short axis orthogonal to the plane of the drawing. As shown, a mirror driver 60 is connected to one end of the mirror 54 and is operable to impart motion about the central pivot 58.

If the driver 60 rotates the mirror 54 in the clockwise direction, as viewed in FIG. 2, the point of impingement of the read beam 26 will be shifted to the left. This would represent a deflection of the beam in a first radial direction. If the driver 58 rotates the mirror 54 in the counter-clockwise direction, then the point of impingement of the transmitted beam 26 will be shifted to the right, as seen in FIG. 2, or in a second, opposite radial direction.

It will be obvious that the reflected beam 38 and the reading beam 26 trace identical paths between the surface of the disc 20 and the beam splitter 30. The articulated mirror 54 serves to "steer" the reading spot to a desired location and then "reads" only the illuminated area, transmitting that information back to the read assembly 28.

In an alternative embodiment, as shown in FIG. 3, a first articulated mirror 54' is provided which is mounted on a central pivot member 58', and is driven about an axis orthogonal to the plane of the FIGURE and in the clockwise and counter-clockwise direction by a first driver 60' that is coupled to the mirror 54' at the end of a long axis.

A second driver 60" is coupled to one end of a third mirror 54" for imparting rotational motion to the third mirror 54" about the long axis that is in the plane of the FIGURE.

In operation, the first driver 60' permits translation of the beams in the "radial" direction to permit "fine" tracking of the information channel. The second driver 60" is used to translate the beam in the circumferential direction, to provide time synchronization, if desired, and to compensate for eccentricity.

In other embodiments, the problem of time synchronization can be handled mathematically, as a step in the process of electronically compensating for eccentricity of the disc 20 and in such embodiments, only the single articulated mirror is used.

Suitable detector circuits are described in the parent U.S. Pat. No. 3,829,622 which issued Aug. 13, 1974, and will not be discussed herein.

It will be apparent from the foregoing that, while particular embodiments of the invention have been illustrated and described, various modifications can be made without departing from the spirit and scope of the invention. Accordingly, it is not intended that the invention be limited, except as by the appended claims.

I claim:

1. Apparatus arranged to read indicia in an information track on a reflective surface of a disc, comprising:
   a laser source means for producing a polarized, collimated reading beam of light radiation having its direction of polarization aligned along a predetermined angular orientation with respect to the optical axis;
   beam directing means for directing such reading beam from said source means along a reading beam path, and for impinging said beam upon said information track;
   optical means for causing said reading beam reflected by said information track to retrace at least a portion of said reading beam path;
   sensing means for receiving said reflected beam from said information track;
   said beam directing means including:
   a beam splitting prism having its angular orientation aligned with the orientation of light in said reading beam for passing all of said reading beam from said source to said information track;
   a quarter wave plate positioned between said beam splitting prism and said information track for shifting the plane of polarization of the reading beam and the reflected beam a total of 90° after the two passages through the quarter wave plate; and
   said beam splitting prism being aligned with the direction of polarization of said reflected beam for directing substantially all of said reflected beam out of the common path and towards said sensing means, whereby any of said reflected beam reaching said laser source means being cross polarized with respect to said polarized, collimated reading beam.

2. In an optical disc playback system including a rotatable turntable adapted to carry an information bearing disc, and having a player element movable relative to the disc, an improved transducer system comprising:
   optical means, carried on the player element, including means defining an optical path having a first portion between a radiant energy source and a polarization dependant beam splitting prism means, a second portion for applying radiant energy from the beam splitting prism means to the disc and for returning radiant energy reflected from the disc to said beam splitting prism means and a third portion for applying returned radiant energy from said beam splitting prism means to an energy sensitive transducer;
   polarization shifting means in said second portion for rotating the plane of polarization of the radiant energy a total of 90° in two passes through said polarization shifting means, whereby any reflected radiant energy reaching said radiant energy source will be cross polarized with respect to the radiant energy from said source;

energy beam steering means in said second path portion for directing a radiant energy beam to a precisely selected location relative to a disc and for directing the reflected portion of the applied radiant energy beam back to said beam splitting prism; and translating means for imparting relative motion between the turntable and the player element at a predetermined rate in the radial direction for transporting said energy beam steering means in the radial direction relative to a disc.

3. The transducer system of claim 2, wherein said polarization shifting means includes a quarter wave plate.

* * * * *

REEXAMINATION CERTIFICATE (926th)
United States Patent [19]
Elliott

[11] B1 4,451,913
[45] Certificate Issued  Sep. 27, 1988

[54] VIDEO DISC READ BACK SCANNER

[75] Inventor: James E. Elliott, San Pedro, Calif.

[73] Assignee: Discovision Associates, Costa Mesa, Calif.

Reexamination Request:
No. 90/000,870, Sep. 30, 1985

Reexamination Certificate for:
Patent No.: 4,451,913
Issued: May 29, 1984
Appl. No.: 290,261
Filed: Aug. 3, 1981

Related U.S. Application Data

[63] Continuation of Ser. No. 924,538, Jul. 14, 1978, Pat. No. 4,282,598, which is a continuation-in-part of Ser. No. 812,180, Jul. 1, 1977, abandoned, which is a continuation of Ser. No. 662,238, Feb. 27, 1976, abandoned, which is a continuation-in-part of Ser. No. 465,823, May 1, 1979, Pat. No. 3,944,727, Ser. No. 299,893, Oct. 24, 1972, Pat. No. 3,829,622.

[51] Int. Cl.⁴ ................................................. G11B 7/00
[52] U.S. Cl. ..................................... 369/110; 369/44; 369/111; 250/225

[58] Field of Search ............ 369/44, 46, 100, 109–111, 369/121, 122; 365/120, 124, 127; 358/342; 250/202, 225, 570; 350/401, 402

[56] References Cited
U.S. PATENT DOCUMENTS

| | | | |
|---|---|---|---|
| 3,401,590 | 9/1968 | Massey | 88/14 |
| 3,969,576 | 7/1976 | Boonstra | 369/110 |
| 3,978,278 | 8/1976 | Bouwhuis | 369/110 |

*Primary Examiner*—Alan Faber

[57] ABSTRACT

A video signal play back device derives video signals from successive tracks formed as a continuous spiral on a video disc using a light source and a lens system, which is carried by a rotatable element at a predetermined spacing from the surface of the disc and which defines a folded optical path. The rotatable element translates the lens system in the radial direction relative to the disc for "coarse" steering of the light beam along the information tracks as the disc is rotated by a turntable. The optical path includes a mirror which is articulated for rotational motion about an axis which shifts the point of impingement of the transmitted light beam upon the disc in the radial direction. The returned beam is directed to a photosensitive pick-up which provides input signals to a circuit which generates a "fine" servo control signal to drive the articulated mirror.

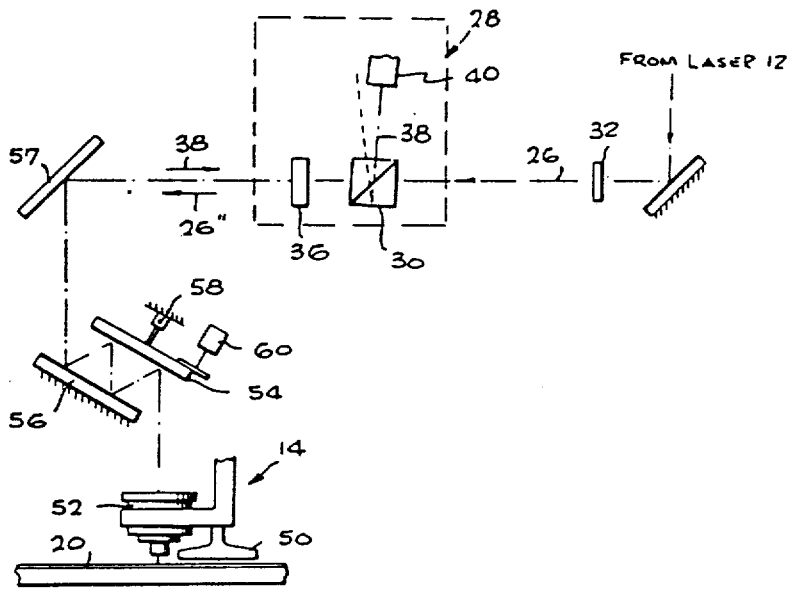

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-3 is confirmed.

New claims 4-15 are added and determined to be patentable.

*4. Apparatus arranged to read indicia in an information track on a reflective surface of a disc, comprising:*
  *a laser source means for producing a polarized, collimated reading beam of light radiation having its direction of polarization aligned along a predetermined angular orientation with respect to the optical axis;*
  *beam directing means for directing such reading beam from said source means along a reading beam path, and for impinging said beam upon said information track;*
  *optical means for causing said reading beam reflected by said information track to retrace at least a portion of said reading beam path;*
  *said information track;*
  *said beam directing means including:*
    *a beam splitting prism having its angular orientation aligned with the orientation of light in said reading beam for passing all of said reading beam from said source to said information track along a substantially straight path through said prism; and*
    *a quarter wave plate positioned between said beam splitting prism and said information track for shifting the plane of polarization of the reading beam and the reflected beam a total of 90 degrees after the two passages through the quarter wave plate,*
  *said beam splitting prism being aligned with the direction of polarization of said reflected beam for selectively reflecting substantially all of said reflected beam out of the common path and towards said sensing means, whereby any of said reflected beam reaching said laser source means is cross polarized with respect to said polarized, collimated reading beam.*

*5. In an optical disc playback system including a rotatable turntable adapted to carry an information bearing disc, and having a player element movable relative to the disc, an improved transducer system comprising:*
  *optical means, carried on the player element, including means defining an optical path having a first portion between a radiant energy source and a polarization dependent beam splitting prism means which selectively passes without deviation light of a first polarization and selectively reflects light of a second polarization perpendicular to that of said first polarization, a second portion for applying radiant energy from the beam splitting prism means to the disc and for returning radiant energy reflected from the disc to said beam splitting prism means to the disc and for returning reflected from the disc to said beam splitting prism means and a third portion for applying returned radiant energy from said beam splitting prism means to an energy sensitive transducer;*
  *polarization shifting means in said second portion for rotating the plane of polarization of the radiant energy a total of 90 degrees in two passes through said polarization shifting means, whereby any reflected radiant energy reaching said radiant energy source will be cross polarized with respect to the radiant energy from said source;*
  *energy beam steering means in said second path portion for directing a radiant energy beam to a precisely selected location relative to a disc and for directing the reflected portion of the applied radiant energy beam back to said beam splitting prism; and*
  *translating means for imparting relative motion between the turntable and the player element at a predetermined rate in the radial direction for transporting said energy beam steering means in the radial direction relative to a disc.*

*6. The transducer system of claim 5, wherein said polarization shifting means includes a quarter wave plate.*

*7. Apparatus arranged to read indicia in an information track on a reflective surface of a disc, comprising:*
  *a laser source means for producing a polarized, collimated reading beam of light radiation having its direction of polarization aligned along a predetermined angular orientation with respect to the optical axis;*
  *beam directing means for directing such reading beam from said source means along a reading beam path, and for impinging said beam upon said information track;*
  *optical means for causing said reading beam reflected by said information track to retrace at least a portion of said reading beam path;*
  *sensing means for receiving said reflected beam from said information track;*
  *said beam directing means including:*
    *a beam splitting prism having its angular orientation aligned with the orientation of light in said reading beam for passing all of said reading beam from said source to said information track; and*
    *a quarter wave plate positioned between said beam splitting prism and said information track for shifting the plane of polarization of the reading beam and the reflected beam a total of 90 degrees after the two passages through the quarter wave plate,*
  *said beam splitting prism being aligned with the direction of polarization of said reflected beam for directing substantially all of said reflected beam out of the common path and towards said sensing means, whereby any of said reflected beam reaching said laser source means being cross polarized with respect to said polarized, collimated reading beam,*
  *said beam splitting prism passing one of said reading beam and said reflected beam along a straight path with substantially no deviation and selectively reflecting the other of said beams.*

*8. In an optical disc playback system including a rotatable turntable adapted to carry an information bearing disc, and having a player element movable relative to the disc, an improved transducer system comprising:*
  *optical means, carried on the player element, including means defining an optical path having a first portion between a radiant energy source and a polarization* dependent beam splitting prism means, a second portion for applying radiant energy from the beam splitting prism means to the disc and for returning radiant energy reflected from the disc to said beam splitting prism means and a third portion substantially perpendicular to said first portion for applying returned radiant energy from said beam splitting prism means to an energy sensitive transducer, said second portion being substantially collinear with one of said first portion and said third portion;

polarization shifting means in said second portion for rotating the plane of polarization of the radiant energy a total of 90 degrees in two passes through said polarization shifting means, whereby any reflected radiant energy reaching said radiant energy source will be cross polarized with respect to the radiant energy from said source;

energy beam steering means in said second path portion for directing a radiant energy beam to a precisely selected location relative to a disc and for directing the reflected portion of the applied radiant energy beam back to said beam splitting prism; and translating means for imparting relative motion between the turntable and the player element at a predetermined rate in the radial direction for transporting said energy beam steering means in the radial direction relative to a disc.

9. The transducer system of claim 8, wherein said polarization shifting means includes a quarter wave plate.

10. Apparatus arranged to read indicia in an information track on a reflective surface of a disc, comprising:

a laser source means for producing a polarized, collimated reading beam of light radiation having its direction of polarization aligned along a predetermined angular orientation with respect to the optical axis;

beam directing means for directing such reading beam from said source means along a reading beam path, and for impinging said beam upon said information track;

optical means for causing said reading beam reflected by said information track to retrace at least a portion of said reading beam path;

sensing means for receiving said reflected beam from said information track;

said beam directing means including:

a beam splitting prism having its angular orientation aligned with the orientation of light in said reading beam for passing all of said reading beam from said source to said information track through two parallel faces of said prism;

a quarter wave plate positioned between said beam splitting prism and said information track for shifting the plane of polarization of the reading beam and the reflected beam a total of 90 degrees after the two passages through the quarter wave plate; and said beam splitting prism being aligned with the direction of polarization of said reflected beam for directing substantially all of said reflected beam out of the common path and towards said sensing means, whereby any of said reflected beam reaching said laser source means is cross polarized with respect to said polarized, collimated reading beam.

11. In an optical disc playback system including a rotatable turntable adapted to carry an information bearing disc, and having a player element movable relative to the disc, an improved transducer system comprising:

optical means, carried on the player element, including means defining an optical path having a first portion between a radiant energy source and a polarization dependent beam splitting prism means through an entry face thereof, a second portion for applying radiant energy from the beam splitting prism means through an exit face, therefore to the disc and for returning radiant energy reflected from the disc to said beam splitting prism means through said exit face, and a third portion for applying returned radiant energy from said beam splitting prism means to an energy sensitive transducer, said exit face being parallel to said entry face;

polarization shifting means in said second portion for rotating the plane of polarization of the radiant energy a total of 90 degrees in two passes through said polarization shifting means, whereby any reflected radiant energy reaching said radiant energy source will be cross polarized with respect to the radiant energy from said source;

energy beam steering means in said second path portion for directing a radiant energy beam to a precisely selected location relative to a disc and for directing the reflected portion of the applied radiant energy beam back to said beam splitting prism; and translating means for imparting relative motion between the turntable and the player element at a predetermined rate in the radial direction for transporting said energy beam steering means in the radial direction relative to a disc.

12. The transducer system of claim 11, wherein said polarization shifting means includes a quarter wave plate.

13. Apparatus arranged to read indicia in an information track on a reflective surface of a disc, comprising:

a laser source means for producing a polarized, collimated reading beam of light radiation having its direction of polarization aligned along a predetermined angular orientation with respect to the optical axis;

beam directing means for directing such reading beam from said source means along a reading beam path, and for impinging said beam upon said information track;

optical means for causing said reading beam reflected by said information track to retrace at least a portion of said reading beam path;

sensing means for receiving said reflected beam from said information track;

said beam directing means including:

a beam splitting prism having an entry face, a parallel first exit face, and a perpendicular second exit face, said prism having its angular orientation aligned with the orientation of light in said redding beam for passing all of said reading beam from said source through said entry face and to said information track through one of said exit faces;

a quarter wave plate positioned between said beam splitting prism and said information track for shifting the plane of polarization of the reading beam and the reflected beam a total of 90 degrees after the two passages through the quarter wave plate; and said beam splitting prism being aligned with the direction of polarization of said reflected beam for directing substantially all of said reflected beam out of the common path and towards said sensing means through the other of said exit faces, whereby any of said reflected beam reaching said laser source means is cross polarized with respect to said polarized, collimated reading beam.

14. In an optical disc playback system including a rotatable turntable adapted to carry an information bearing disc, and having a player element movable relative to the disc, an improved transducer system comprising:

optical means, carried on the player element, including means defining an optical path having a first portion between a radiant energy source and a polarization dependent beam splitting prism means through an entry face thereof, a second portion for applying radiant energy from the beam splitting prism means through a first exit face thereof to the disc and for returning radiant energy reflected from the disc to said beam splitting prism means through said first exit face and a third portion for applying returned radiant energy from said beam splitting prism means through a second exit face thereof to an energy sensitive transducer, one of said exit faces being parallel to said entry face, and the other of said exit faces being perpendicular to said entry face;

polarization shifting means in said second portion for rotating the plane of polarization of the radiant energy a total of 90 degrees in two passes through said polarization shifting means, whereby any reflected radiant energy reaching said radiant energy source will be cross polarized with respect to the radiant energy from said source;

energy beam steering means in said second path portion for directing a radiant energy beam to a precisely selected location relative to a disc and for directing the reflected portion of the applied radiant energy beam back to said beam splitting prism; and translating means for imparting relative motion between the turntable and the player element at a predetermined rate in the radial direction for transporting said energy beam steering means in the radial direction relative to a disc.

15. The transducer system of claim 14, wherein said polarization shifting means includes a quarter wave plate.

* * * * *